United States Patent [19]

McLain

[11] 3,844,692
[45] Oct. 29, 1974

[54] PROTECTIVE SHIELDS FOR ROTARY INTERNAL COMBUSTION ENGINE ROTOR TIP SEALS

[75] Inventor: Charles D. McLain, Alton, Ill.
[73] Assignee: Olin Corporation, New Haven, Conn.
[22] Filed: May 16, 1973
[21] Appl. No.: 360,746

[52] U.S. Cl. .............................................. 418/113
[51] Int. Cl.... F01c 19/02, F04c 15/00, F04c 27/00
[58] Field of Search .............................. 418/112–124

[56] References Cited
UNITED STATES PATENTS

| | | | |
|---|---|---|---|
| 2,812,748 | 11/1957 | Simonian | 418/112 |
| 3,142,440 | 7/1964 | Schagg | 418/117 |
| 3,189,263 | 6/1965 | Ansorg | 418/122 |
| 3,263,912 | 8/1966 | Frenzel | 418/121 |
| 3,730,655 | 5/1973 | Lamm | 418/122 |

Primary Examiner—John J. Vrablik
Attorney, Agent, or Firm—Charles E. Sohl; Robert H. Bachman

[57] ABSTRACT

A shield system for protecting rotor tip seals in rotary internal combustion engines. The shields are attached to the rotor face adjacent to and parallel to the rotor tip seals with the height of the shield above the rotor face being from 60 to 90 percent of the distance between the rotor face and the combustion chamber wall. The shields are preferably rigidly mounted to the rotor and serve to protect the rotor tip seal from the deleterious effects of thermal and mechanical shock and erosion by the combustion gases.

20 Claims, 6 Drawing Figures

PROTECTIVE SHIELDS FOR ROTARY INTERNAL COMBUSTION ENGINE ROTOR TIP SEALS

BACKGROUND OF THE INVENTION

The rotary combustion or Wankel engine is being considered for use as a replacement for the conventional reciprocating piston type internal combustion engine in automotive and other similar size engines.

The advantages of the rotary internal combustion engine includes simplicity, light weight and small size. Basically the engine consists of a triangular shaped rotor which rotates eccentrically within a chamber having an epitrochoidal or modified figure eight shape. Seals at the tips of the rotor serve to divide the space within the cavity into three working spaces. As the rotor rotates these three working spaces also rotate and their volume changes as a function of rotation. These changes in volume are used to compress the air-fuel mixture which is subsequently burned and exhausted. The expansion caused by the burning of the air-fuel mixture provides the energy which is developed into power output.

A significant difficulty encountered in the development and the use of the rotary internal combustion engine is the short life of the rotor tip seals heretofore encountered. During operation of the engine these seals have a high velocity relative to the chamber wall and tend to wear rapidly. Difficulties are also encountered due to thermal and mechanical shock which arises during operation of the engine. It has heretofore been extremely difficult to provide an economical seal material having a combination of good wear resistance and good resistance to thermal and mechanical shock. For example, some engine designs have used seals which are basically composed of carbon. Although this type of seal is long wearing it is brittle and tends to fracture under abnormal operating conditions such as preignition and operation under heavy engine load.

Present rotary internal combustion engine design is limited by the wear which occurs between rotor tip seal and the chamber wall, and by the maximum amount of thermal and mechanical shock which the rotor tip seal can withstand.

SUMMARY OF THE INVENTION

The present invention consists of a shield system for protecting the rotor tip seals used in rotary internal combustion engines. The shields consist of at least one strip-like member located in a fixed position relative to the rotor and located in close proximity to the rotor tip seal. The shields are preferably composed of a metal or metal alloy and are preferably rigidly fastened to the rotor. The purpose of the shield is primarily to block the hot gases and thermal and mechanical shock encountered during operation of the engine. The rotor tip seals may then be designed to seal more effectively since it is not necessary that the design of the seals take into account thermal and mechanical shock.

It is an object of this invention to provide an improved sealing system for use in rotary internal combustion engines.

It is a further object of this invention to provide shields for the protection of rotor tip seals from thermal and mechanical shock.

Yet another object of the present invention is to provide a shield system whereby leakage and blow-by are reduced.

A further object of this invention is to provide methods for mounting shields for rotor tip seals.

DESCRIPTION OF THE INVENTION

Figure 1:
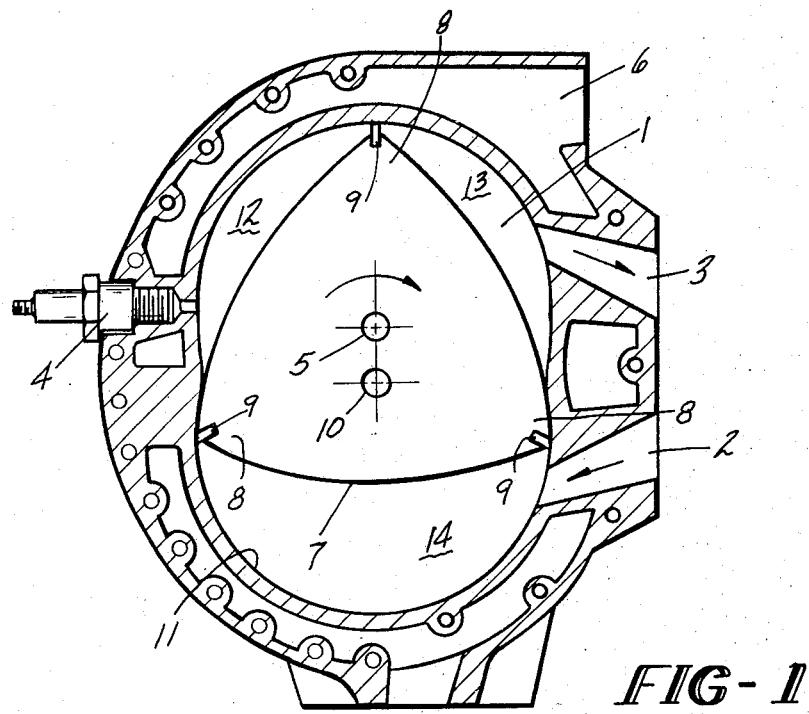
FIG. 1 shows a cut away drawing of a typical rotary internal combustion engine.

A cross sectional view of a rotary combustion engine is shown in FIG. 1. The engine comprises an epitrochoidal chamber 1 having an intake port 2 and an exhaust port 3 passing through the chamber wall 11 for the flow of gases during operation of the engine and an ignition means 4 for igniting the air-fuel mixture. The epitrochoidal chamber is cooled by water which flows through a water passage 6 within the wall 11 of the chamber. Within the epitrochoidal chamber is a rotor 7 having three apexes 8. At each apex 8 there is a seal 9 which contacts the inner wall 11 of the chamber. These apex seals serve to divide the space between the rotor and the chamber wall into three working spaces 12, 13 and 14. As the rotor rotates the working spaces 12, 13 and 14 rotate and the different cycles of the combustion process occur. For example, when the rotor is in the position shown in FIG. 1, combustion is occuring in space 12 and the intake process is occuring in space 14. The rotor rotates about an axis 5 which in turn rotates about the center 10 of the epitrochoidal chamber 1.

As previously mentioned one of the problems encountered to date in the development of the rotary internal combustion engine has been the deterioration of the rotor tip seals because of the presence of high temperatures and thermal and mechanical shock. It has heretofore been extremely difficult to provide a seal which is capable of withstanding the temperatures and shock conditions encountered during use.

The edges of the rotor tip seal are described as leading and trailing depending upon their position relative to the direction of rotation of the rotor. Because of the eccentric geometry of the rotary internal combustion engine the geometry of the rotor tip seal relative to the chamber wall changes as the rotor rotates. As the rotor tip seal moves from minor axis 17 to major axis 16, shown in FIG. 2, the rotor tip seal adapts an increasing angle until it reaches the midway point between the major axis 16 and the minor axis 17. Then the angle is gradually reduced until it reaches 0° at the major axis 16. A similar situation exists as the rotor tip seal moves from the major axis 16 to the minor axis 17 except that the angle is a trailing angle. When the rotor tip seal is at the major or minor axis it is perpendicular to the chamber wall. Experience with the existing forms of rotary internal combustion engines has shown that the seals tend to wear more rapidly on the leading edge than on the trailing edge.

The basic embodiments of the invention will be described with reference to FIG. 2. The invention consists of a series of shields, 20, 21, 22, 23 and 24 which are mounted on the rotor 7 in close proximity to the rotor tip seals 9A, 9B and 9C. As previously mentioned the rotor tip seals 9A, 9B, 9C serve to fill the space which exists between the rotor tip 8 and the chamber wall 11. The shields of the present invention are preferably arranged so that the height above the rotor is equal to between 60 and 90 percent of the distance between the rotor, at the point where the shield is mounted, and the chamber wall. The distance between the rotor tip seal and the shield is preferably between .1 and .5 inches. This embodiment is shown in FIG. 2 wherein shields 20 and 21 serve to protect the rotor tip seal 9A.

It is a consequence of the geometry of the rotary internal combustion engine that the gap between the rotor tip 8 and the chamber wall 11 remains constant throughout the rotation of the rotor. Commonly used rotor tip seal designs which employ movable seals which are urged outwardly from the rotor to contact the chamber wall by the influence of centrifugal force and spring loading. In this fashion reduction of sealing efficiency by wear is eliminated. It is a preferable embodiment of the present invention that the rotor tip seal shields be mounted rigidly with relation to the rotor. It is not desirable that the shields ever contact the chamber wall since undue wear could result. If the shields will never contact the chamber wall it is possible to fabricate them from a highly refractory heat resistant material.

Figure 2:
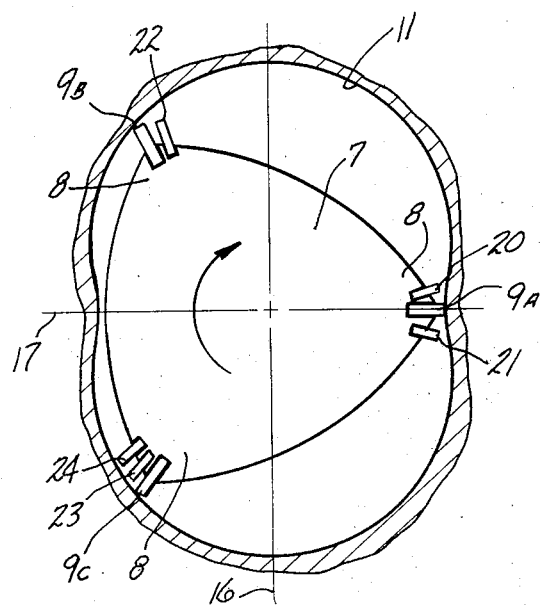
FIG. 2 shows several embodiments of the shields of the present invention, including shields located on both sides of the rotor tip seal, and a shield located on one side of the rotor tip seal, and the use of multiple shields to protect the rotor tip seal.

Another embodiment of the present invention is also shown in FIG. 2. As has previously been mentioned, experience with conventional rotary internal combustion engines has shown that the leading edge of the rotor tip seal tends to wear at least twice as fast as the trailing edge of the seal. A simplified and economical embodiment of the invention is shown in FIG. 2 wherein rotor tip seal 9B has its leading edge protected by a single shield 22. Since most of the wear on the rotor tip seal occurs on the leading edge, most of the benefit of the present invention may be obtained through the use of a single rotor tip seal shield located adjacent to the leading edge of the seal.

Yet another embodiment of the invention is shown in FIG. 2 with reference to rotor tip seal 9C. While the previous discussion of the present invention has discussed only the use of one seal to protect one side of the rotor tip seal, it may be advantageous to use more than one seal, particularly to protect the leading edge of the rotor tip seal. In FIG. 2, seal 9C has its leading edge protected by two shields, 23 and 24. While one rotor tip seal shield will block between 60 and 90 percent of the thermal and mechanical shock encountered in the operation of the engine, through the use of two shields it is possible to block in excess of 90 percent of the deleterious effect of the expanding gases. When multiple shields are used it is preferred that the shield to shield spacing be from 0.1 to 0.5 inches. It is also possible to use more than two shields, however this is not a preferred embodiment.

Of course, the embodiments depicted in FIG. 2 do not exhaust the possibilities of the present invention. For example it may be found desirable to use two shields to protect the leading edge of the seal and one shield to protect the trailing edge. Another possibility would be to use two shields to protect the leading edge and two shields to protect the trailing edge of the seal.

The shields employed in the present invention may be fabricated from a wide variety of materials. It is preferable that the shields be constructed of a metallic material. Metallic materials are favored because of their inherent ductility, heat transfer properties, and ease of fabrication. It is desirable that the material from which the seals are fabricated be selected to have a combination of the following properties; high melting point, high thermal conductivity, moderate ductility, and high creep strength. The thickness of the shield must be adequate to permit the conduction of heat into the rotor. It is preferred that the shields have a thickness of from 0.05 to 0.3 inches.

Figure 3:
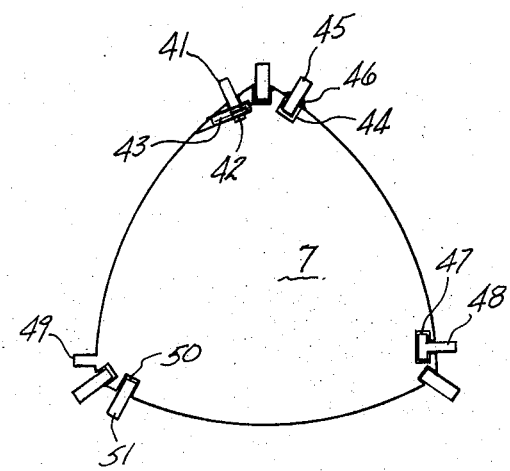
FIG. 3 shows a variety of means for locating the shields relative to the rotor.

FIG. 3 shoes a variety of methods which may be employed to fasten the shields to the rotor. For example a shield 41 may be places in a slot 42 in the rotor 7 and may be held in place through the use of a pin 43. The pin 43 may be secured in place by threading it or making the pin slightly larger than the hole so that a force fit results. In a practical application, a multiple number of pins would be used, depending upon the rotor width and the forces involved. Another desirable embodiment is shown with reference to shield 45. The shield 45 is placed in slot 44 and held firmly in place by applying a weld bead 46. This is a desirable embodiment because the application of a weld bead improves the heat transfer between the shield and the rotor thus safeguarding the shield from melting. Another desirable embodiment is shown with reference to shield 48. The shield has a T-shaped cross section and is fitted into slot 47 which has a similar T-shaped configuration. The shield is restrained from moving outwardly because of its shape. Another desirable embodiment shows shield 49 being formed in an integral part of the rotor during the fabrication process. This is a desirable embodiment because of its simplicity and because of the resultant high heat transfer rate between the shield and the rotor. A final embodiment shows the shield 51 free to move in a slot 50. In this embodiment shield would contact the chamber wall and for this reason the shield material must be carefully selected. This embodiment has the advantage of being able to block out substantially 100 percent of the deleterious effects of the hot gases encountered during operation of the engine. However, because of the wear problem between the shield and the chamber wall, this embodiment is not preferred.

The embodiments of the invention described herein above have all been described in terms of the use of solid shields. In certain applications it may be desirable to have a shield having a non-solid or perforated configuration. For example a shield may be fabricated having a series of slots cut through it with the slots extending substantially from the outer edge of the shield to the rotor face. The advantage of such a slotted shield is that it serves to baffle and deflect the thermal and mechanical shock waves from the shield material itself. A desirable embodiment of the slotted shield idea is the use of multiple slotted shields arranged so that the slots of one shield are offset from the slots of another shield. In this fashion the rotor tip seal is protected from direct exposure to thermal and mechanical shock waves at the same time the load imposed on the shields by the thermal and mechanical shock waves is divided between the two shields. In practice, the slots in the shield would be spaced so that the distance between the centerlines of the slots would be approximately equal to twice the width of the slots.

Figure 4:
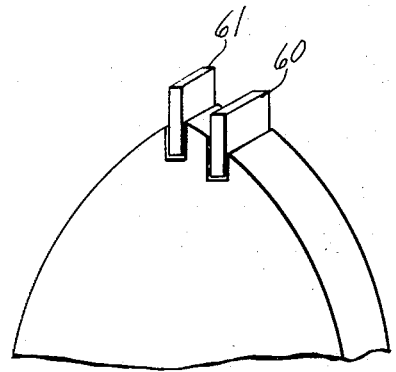
FIG. 4 shows the use of a solid shield to protect the rotor tip seals.

FIG. 4 shows a perspective view of the solid rotor tip seal shield disclosed previously. Shield 60 serves to protect seal 61.

Figure 5:
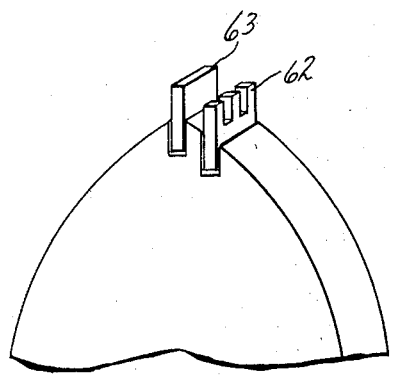
FIG. 5 shows the use of one shield having a plurality of grooves or slots cut within it.

FIG. 5 shows the use of a slotted shield system. Slotted shield 62 serves to protect seal 63 by blocking a significant portion of the combustion gases.

Figure 6:
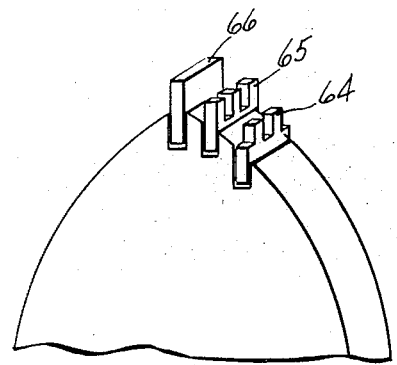
FIG. 6 shows the use of a plurality of shields each of which has a plurality of grooves cut within it.

FIG. 6 shows the use of multiple slotted shields to protect the rotor tip seal. Slotted seals 64 and 65, protect seal 66. The slotted shield 64 and 65 are placed so that the slots of shield 64 are offset from the shield of 65 thereby effectively protecting seal 66 from the combustion cycle.

The mounting system previously described with reference to FIG. 3 are equally adaptable for mounting of the types of shields such as slot shields.

It is to be understood that the invention is not limited to the illustrations described and shown herein, which are deemed to be merely illustrative of the best modes of carrying out the invention, and which are suitable of modification of form, size, arrangement of parts and details of operation. The invention rather is intended to encompass all such modifications which are within the spirit and scope as defined by the claims.

What is claimed is:

1. An improved sealing system for use in rotary internal combustion engines of the type having a hollow epitrochoidal shaped chamber defined by a wall and a rotor having a plurality of apex portions, each apex portion having a tip, the rotor being rotatably and eccentrically mounted for motion within the chamber so that a space exists between the tip and the chamber wall, comprising: strip-like sealing means located at each rotor tip with said sealing means being movably mounted and projecting from the rotor tip so as to fill the space between the rotor tip and the chamber wall, and a rotor tip seal shield located adjacent to, parallel to, and spaced from in advance of each of the rotor tip sealing means, with said shield being rigidly fixed to the rotor, with the height of the shield above the rotor face being equal to from 60 to 90 percent of the distance between the rotor face at the point where the shield is mounted, and the chamber wall, whereby said shield protects the rotor tip sealing means from thermal and mechanical shock during the operation of the engine.

2. An improved form of rotary internal combustion engine comprising:
A. a hollow epitrochoidal chamber defined by a wall;
B. a rotor having a plurality of apex portions, with each apex portion having a tip, and with each rotor being rotatably and eccentrically mounted for motion within the cavity so that a space exists between the chamber wall and the rotor tip;
C. strip-like sealing means attached to the rotor to seal the space between the rotor tip and the chamber wall;
D. at least one shield means located adjacent to, parallel to, and spaced from in advance of the sealing means, with said shield being rigidly fixed to the rotor, with the height of the shield above the rotor face being equal to from 60 to 90% of the distance between the rotor face at the point where the shield is mounted, and the chamber wall, whereby said shield means protects the sealing means from thermal and mechanical shock, and;
E. means to supply a combustible air-fuel mixture;
F. means to ignite said combustible mixture; and
G. means to remove the products of combustion resulting from the combustion of said combustible mixture.

3. A shield system for protecting rotor tip seals in rotary internal combustion engines of the type having a hollow epitrochoidal shaped chamber defined by a wall and a rotor having a plurality of apex portions, each apex portion having a tip, the rotor being rotatably and eccentrically mounted for motion within the chamber so that a space exists between the tip and the chamber wall, with the rotor having a strip-like sealing means located at each tip so as to effectively fill the space between the rotor and the cavity wall, comprising: at least one rotor tip seal shield mounted on the surface of the rotor parallel to and from 0.1 to 0.5 inches away from each of the rotor tip sealing means, with the height of the shield above the rotor face being equal to from 60 to 90 percent of the distance between the rotor face, at the point where the shield is mounted, and the chamber wall, whereby said at least one shield serves to protect the tip sealing means from mechanical and thermal shock during operation of the engine.

4. A system as in claim 3 wherein the shields have a thickness of from 0.050 inch to 0.300 inch.

5. A system as in claim 3 wherein the shields do not touch the cavity wall.

6. A system as in claim 3 wherein one shield is located on either side of the rotor tip sealing means.

7. A system as in claim 3 wherein multiple seals are located on at least one side of the rotor tip sealing means.

8. A system as in claim 3 wherein said shields are formed integrally with the rotor.

9. A system as in claim 3 wherein the shields are placed in grooves in the rotor face.

10. A system as in claim 9 wherein the shields are rigidly fixed in said grooves.

11. A system as in claim 9 wherein the shields are fixed to the rotor by a welding process.

12. A system as in claim 9 wherein the shields are fixed in said grooves by at least one pin, said at least one pin passing through the rotor and the shield.

13. A system as in claim 9 wherein said groove has a cross sectional shape such that the width of the groove within the rotor is greater than the width of the groove at the rotor face and wherein the shield has a similar cross sectional shape.

14. A system as in claim 3 wherein said shield has a series of slots cut through it with the depth of the slots being substantially equal to the distance which the shields project out from the rotor, and with the width of the slots being substantially equal to or less than half the distance between the centerlines of adjacent slots.

15. A system as in claim 14 wherein the shields are placed in grooves in the rotor face.

16. A system as in claim 14 wherein the shields are rigidly fixed in said grooves.

17. A system as in claim 3 wherein said shields each consist of two parts, each of which has slots cut through it with the depth of the slots being substantially equal to the distance which the shields project out from the rotor, and with the slots being spaced so that the distance between the centerlines of the slots is equal to or less than twice the width of the slots and with the two pieces arranged so that the slots in one piece oppose the projection between the slots in the other piece.

18. A system as in claim 17 wherein the spacing from the shield to the closest rotor tip sealing means is from 0.1 inch to 0.5 inch.

19. A system as in claim 17 wherein the shields are placed in grooves in the rotor face.

20. A system as in claim 17 wherein the shields are rigidly fixed in said slots.

* * * * *